(12) United States Patent
Johnson et al.

(10) Patent No.: US 10,399,678 B2
(45) Date of Patent: Sep. 3, 2019

(54) AMENITY MONUMENT FOR AIRCRAFT CABINS

(71) Applicant: B/E Aerospace, Inc., Wellington, FL (US)

(72) Inventors: Glenn A. Johnson, Rural Hall, NC (US); Mark B. Dowty, Rural Hall, NC (US)

(73) Assignee: B/E Aerospace, Inc., Winston Salem, NC (US)

( * ) Notice: Subject to any disclaimer, the term of this patent is extended or adjusted under 35 U.S.C. 154(b) by 395 days.

(21) Appl. No.: 15/477,044

(22) Filed: Apr. 1, 2017

(65) Prior Publication Data

US 2017/0283063 A1  Oct. 5, 2017

Related U.S. Application Data

(60) Provisional application No. 62/316,691, filed on Apr. 1, 2016.

(51) Int. Cl.
| | | |
|---|---|---|
| *B64D 11/06* | (2006.01) | |
| *B64D 11/00* | (2006.01) | |
| *B64D 11/04* | (2006.01) | |

(52) U.S. Cl.
CPC ...... *B64D 11/0601* (2014.12); *B64D 11/0015* (2013.01); *B64D 11/0023* (2013.01); *B64D 11/0602* (2014.12); *B64D 11/04* (2013.01); *B64D 11/06* (2013.01)

(58) Field of Classification Search
CPC ..... B64D 11/0015; B64D 11/04; B64D 11/06; B64D 11/0601; B64D 11/0007; B64D 11/0023; B64D 11/0606; B64D 11/064; B64D 11/00; B64D 11/0641; B64D 11/00155; B64D 11/0602
See application file for complete search history.

(56) References Cited

U.S. PATENT DOCUMENTS

| | | | |
|---|---|---|---|
| 2008/0192213 A1* | 8/2008 | Johnson | ................ F21V 21/30 353/119 |
| 2009/0121523 A1* | 5/2009 | Johnson | ................ B60N 3/004 297/140 |
| 2009/0200422 A1* | 8/2009 | Johnson | ............ B64D 11/0023 244/118.5 |

(Continued)

*Primary Examiner* — Assres H Woldemaryam
(74) *Attorney, Agent, or Firm* — Clements Bernard Walker PLLC; Jeffrey S. Bernard (57) ABSTRACT

Preferred embodiments relate to an amenity monument installed in the middle of a cabin space that absorbs "dead-space" in a seating layout while simultaneously providing features and amenities that are desirable to passengers. In preferred embodiments, this may substantially enhance the array of seating options and configurations available to an aircraft interior designer. In certain embodiments, the amenity monument may be equipped with dimmable panels that are set to a transparent condition during taxi, take-off and landing. During flight, the dimmable panels may be set to a translucent or opaque condition that provides privacy for the passenger utilizing the amenity monument as well as passengers seated nearby. In some embodiments, the monuments may provide enhanced amenities like curved, surround-view screens and which display gaming, advertising, multimedia and/or retail content.

20 Claims, 9 Drawing Sheets

(56) References Cited

U.S. PATENT DOCUMENTS

| | | | |
|---|---|---|---|
| 2010/0163469 A1* | 7/2010 | Wan | G05D 21/02 |
| | | | 210/96.1 |
| 2011/0101160 A1* | 5/2011 | Gomes | B64C 1/1423 |
| | | | 244/118.5 |
| 2012/0025018 A1* | 2/2012 | France | B64D 11/0023 |
| | | | 244/118.6 |
| 2012/0318918 A1* | 12/2012 | Johnson | B64D 11/06 |
| | | | 244/118.6 |
| 2013/0242523 A1* | 9/2013 | Wallace | B60R 11/0235 |
| | | | 361/807 |
| 2013/0248653 A1* | 9/2013 | Round | B64D 11/06 |
| | | | 244/118.6 |
| 2015/0360783 A1* | 12/2015 | Cailleteau | B60N 2/345 |
| | | | 244/118.6 |
| 2016/0009396 A1* | 1/2016 | Seibt | B64D 11/02 |
| | | | 244/118.5 |

\* cited by examiner

AMENITY MONUMENT FOR AIRCRAFT CABINS

RELATED APPLICATIONS

This application claims priority to U.S. Provisional Patent Application Ser. No. 62/316,691, entitled "Airline Onboard Revenue Generating Display Area," filed Apr. 1, 2016, which is herein incorporated by reference in its entirety. This application also incorporates by reference, in its entirety, U.S. patent application Ser. No. 15/288,823 to B/E Aerospace, Inc., entitled "Aircraft Modular Lavatory System," filed Oct. 7, 2016.

BACKGROUND

During some portions of a flight, passengers may be permitted to leave their seat. For example, on a long flight lasting more than 3 hours, lack of physical movement can create unhealthy conditions, such as limited blood flow in the lower extremities. When passengers leave their seats to stretch their legs, they typically have little opportunity to find someplace of interest in the cabin where they are allowed to go. Also, passengers may find clearance difficult due to activities in the aisle such as meal service or beverage service.

The inventors recognized the need for a location for passengers to temporarily dwell while taking a break from sitting. Additionally, the inventors recognized the need for a location where a passenger may tuck in to avoid collision with a galley cart or other aisle impedance.

The inventors also recognized that this need could be satisfied by utilizing "dead space" that occurs in certain aircraft seating layouts. For example, business class suite layouts in certain aircraft sometimes leave areas of the cabin floor unused. Heretofore such layouts were generally avoided or the suites were rearranged such that the unused spaced is positioned adjacent a bulkhead or other monument such that an additional monument such as a storage cabinet may be conveniently positioned in the gap. Such storage cabinets generally cannot be positioned in the middle of a cabin, including because safety guidelines require flight attendants to have line of sight across the cabin during take-off and landing. Seating layouts have substantially limited by the constraint that "dead space" in the middle of a cabin must generally be avoided. By eliminating this constraint, the inventors have substantially broadened the scope of available seating layouts.

SUMMARY OF ILLUSTRATIVE EMBODIMENTS

Preferred embodiments relate to an amenity monument installed in the middle of a cabin space that absorbs "dead-space" in a seating layout while simultaneously providing features and amenities that are desirable to passengers. In preferred embodiments, this may substantially enhance the array of seating options and configurations available to an aircraft interior designer. In certain embodiments, the amenity monument may be equipped with dimmable panels that are set to a transparent condition during taxi, take-off and landing. During flight, the dimmable panels may set to a translucent or opaque condition that provides privacy for the passenger utilizing the amenity monument as well as passengers seated nearby. In some embodiments, the monuments may provide enhanced amenities like curved, surround-view screens and which display gaming, advertising, multimedia and/or retail content.

In a preferred embodiment, the amenity monument is defined in part by a partition formed in part by the privacy partitions of one or more adjacent passenger seating suites, where a footwell of at least one passenger seating suite extends into and is encompassed by features of the amenity monument. For example, a footwell region of a passenger suite may be hidden behind exterior vertical surfaces of a storage compartment section of the amenity monument. The storage compartment, for example, may be disposed beneath a horizontal surface (e.g., countertop). The amenity monument, in one example, may be used for displaying multimedia information to passengers including advertisements and/or the opportunity to purchase retail items. Further to the example, the storage compartment may house merchandise available for purchase. In another example, the amenity monument may be used for displaying destination information such as lodging, activities and sites of interest. The storage compartment, according to this example, may house travel brochures or other materials related to travel destinations.

The amenity monument, in some embodiments, includes an inset region in an interior of the amenity monument sized to accept an average adult passenger such that a galley cart may transit an aisle abutting the amenity monument. The inset region, for example, may be bound by the footwell of two opposing passenger suites between which the amenity monument is situated.

In some embodiments, to provide increased privacy to passengers in the passenger suite(s) adjacent to the amenity monument, one or more privacy panels may be disposed from an upper edge of adjoining partitions of the passenger suite(s) to at least an eye level of an average passenger. The one or more privacy panels, in some implementations comprise transparent, dimmable material. In another example, at least one of the one or more privacy panels comprises at least a portion of a display monitor configured to present visitors to the amenity monument with information.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Figure 1:
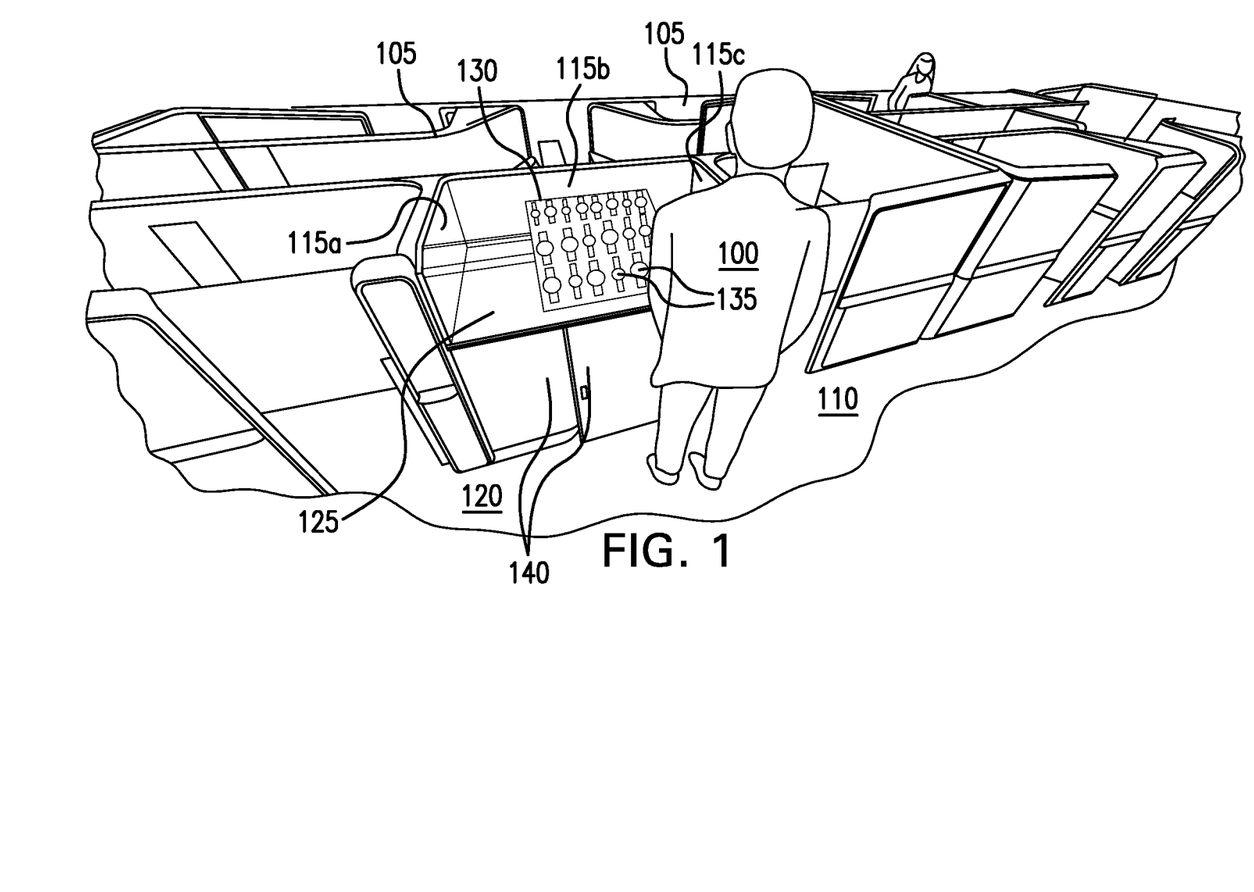
FIG. 1 depicts a schematic diagram representing a passenger usage of an easily accessible display space on an airplane installed with an exemplary airline display compartment.

FIG. 1 depicts a schematic diagram representing a passenger usage of an easily accessible display space on an airplane installed with an exemplary airline display compartment. In the depicted figure, a passenger 100 approaches an amenity monument 105 from an aisle 110. The amenity monument 105 is installed adjacent to the aisle 110 with at least three partitions 115a-115c extending from the floor 120 towards a ceiling. The three partitions create a partial enclosure and do not reach a ceiling in this depiction. Furthermore, at a defined height above a cabin floor 120, a planar surface 125 extends parallel to the floor 120 from a partition 115b towards the aisle 110. The planar surface 125 supports various displays 130 with examples of physical items 135. Between the surface 115 and the floor 120, there are various enclosed storage compartments 140. The storage compartments 140 may store inventory of the physical items 135 or any other item displayed in the display 130. In some implementations, a footwell of an aft-adjacent and/or a forward-adjacent suite may protrude into the space under the planar surface 125.

The amenity monument 100 can be installed on an airplane to advantageously use non-revenue-generating space to produce revenue for an airline and various airline partners. Furthermore, the construction of amenity monument 105 allows a passenger 100 to access the amenity monument 105 easily from the aisle 110 and allows the passenger 100 to view physical items 135 in partial privacy. The partitions 115a-115c may extend from a floor 120 all the way to a ceiling or may only extend part of the way to a ceiling. The height of the partitions 115a-115c may offer some or very little privacy for a passenger 100 to view and browse the items for purchase 135. The installation of the amenity monument 105 may, in some embodiments, advantageously encourage passengers to walk about the cabin during flight, and may advantageously create additional value for passengers, and potential revenue-generating opportunities for the airline.

The various displays 130 on the planar surface 125 may be virtual or physical. For virtual displays, the display may be a projection or may be on a screen capable of interaction. However, the inventory in the storage compartments 140 are physical items. In some embodiments, the storage compartments 140 have doors that swing or slide open, but the doors may alternately slidably retract and protrude towards the aisle 110. The storage compartments 140 may be installed with a locking mechanism. The locks may be integrated with a payment mechanism to engage or disengage when payment is made so that the physical items 135 may be dispensed to the passenger 100. The locks may be manually accessed by a flight attendant or other airline professional to dispense the physical items 135 purchased by the passenger 100. In some embodiments, the locks may automatically engage or disengage with an integrated payment system to dispense the physical items 135 to the passenger 100. In some embodiments, a payment mechanism may be installed as a device in the amenity monument 105. A payment mechanism may also be operated by a flight attendant or other airline professional through a mobile terminal. The payment mechanism, in some embodiments, may be provided through readily available software installed on personal passenger devices or provided airline devices.

The physical items 135, in some embodiments, may be luxury goods. Luxury goods can include jewelry, watches, or other physical items 135. The luxury goods may, in some embodiments, be perfumes or luxury gift items. In some embodiments, the luxury goods may be similar to physical items available in a Duty-Free airport shop at a destination and available for pick up upon arrival. The physical items 135 would be available to the passenger 100 to enhance their inflight experience, to provide entertainment, and to encourage movement during a flight. The amenity monument 105 may advantageously promote happier customers and additional revenue streams.

Figure 2:
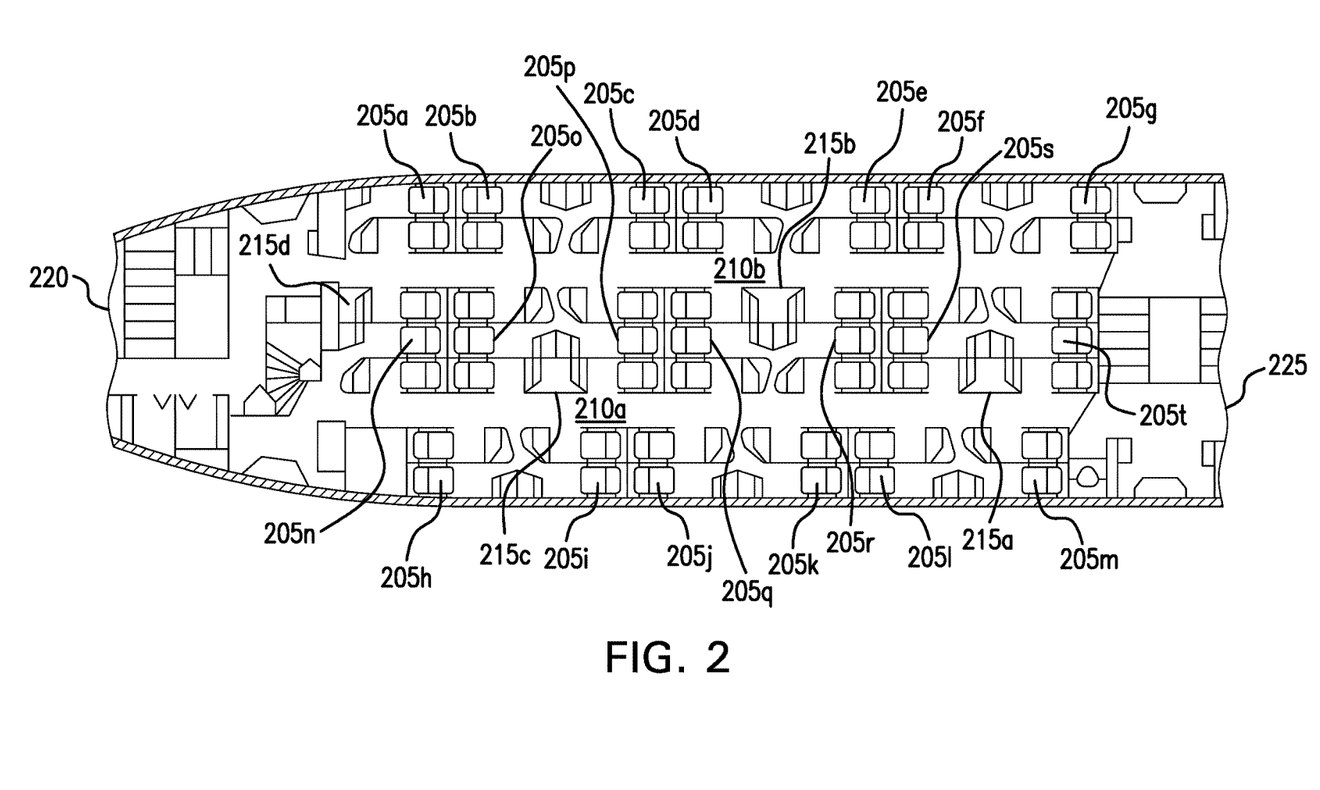
FIG. 2 depicts a schematic diagram of an airplane layout installed with various exemplary airline display compartments.

FIG. 2 depicts a schematic diagram of an airplane cabin layout installed with various exemplary airline display or amenity monuments. In the depicted FIG. 2, an exemplary layout of an airplane 200 is provided including various seating units 205a-205t, aisles 210a-210b, and various amenity monuments 215a-215c. The aisles 210a-210b extend between a front 220 of the airplane 200 towards a back 225 of the airplane 200. The compartments 215a-215c are easily accessible from the aisles 210a-210b and interspersed around the aircraft cabin 200. The compartments 215a-215c are advantageously placed around the aircraft to be accessible to passengers from various seating compartments 205a-205t. The passengers, during flight, may walk around their section of the aircraft and interact with the display or amenity monuments providing movement opportunities and entertainment.

Figure 3:
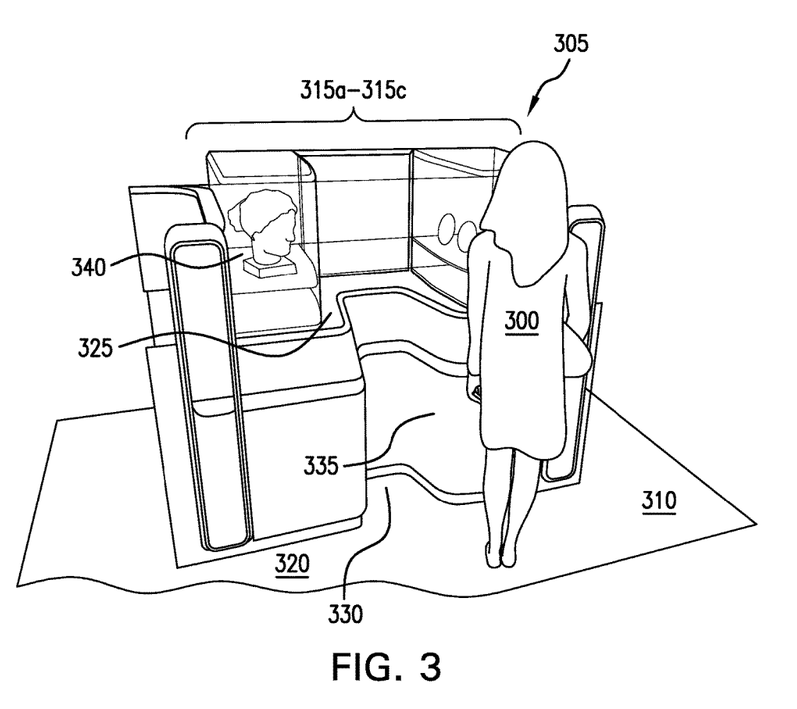
FIG. 3 depicts a schematic diagram representing a passenger usage of an exemplary configuration of an airline display compartment.

FIG. 3 depicts a schematic diagram representing a passenger usage of an exemplary configuration of an airline display compartment. In the depicted FIG. 3, an airplane passenger 300 engages with a display compartment 305. The display compartment 305 is installed adjacent to an aisle 310, which extends between a front of a plane and a back of a plane, and constructed of various partitions 315a-315c which extend from a floor 320 towards a ceiling and various planar surfaces 325 parallel to a cabin floor 320. The partitions 315a-315c may only extend partially towards a ceiling. The planar surfaces 325 are constructed such that the passenger 300 can engage with the display compartment 305 from the aisle 310 or by stepping into an inner display compartment 330. The inner display compartment 330 is defined by an inner surface 335 of the planar surfaces 325. The planar surface 325 is constructed to support various displays 340. The display compartment 305 is advantageously constructed to allow a passenger 300 to engage with various displays 340 while keeping the aisle 310 clear. The display compartment 305 additionally allows an under-commercialized space on an airplane to be converted into a revenue-generating space, while maintaining regular operations on the plane.

The display compartment 305 allows a passenger 300 to engage with various displays 340 while on an airplane. The various displays 340 may be virtual or physical. Virtual displays, for example, may be projections or may be viewable on interactive screens. The virtual displays may allow a passenger 300 to preview attractions at the destination or at other destinations for future trips. The attractions may be previews of museums, points of interest, activities of interest, flight connection, luggage pickup, or terminal amenities, or local businesses at the passenger's destination (e.g., hotels, airport terminal kiosk information, transportation options). The businesses previewed, for example, may be popular restaurants or stores. The activities of interest previewed, for example, may be installed by tour guide companies, museums, or theaters. The physical displays may be similar to the physical goods displays depicted in FIG. 1. In some embodiments, the physical displays may be replicas of museums, points of interest, or of other possible destinations. The physical displays may be informational, to allow the passenger 300 to better navigate the destination airport, or the destination city. The display compartment 305 may advantageously allow for passenger education and a premium passenger experience.

Figure 4A:
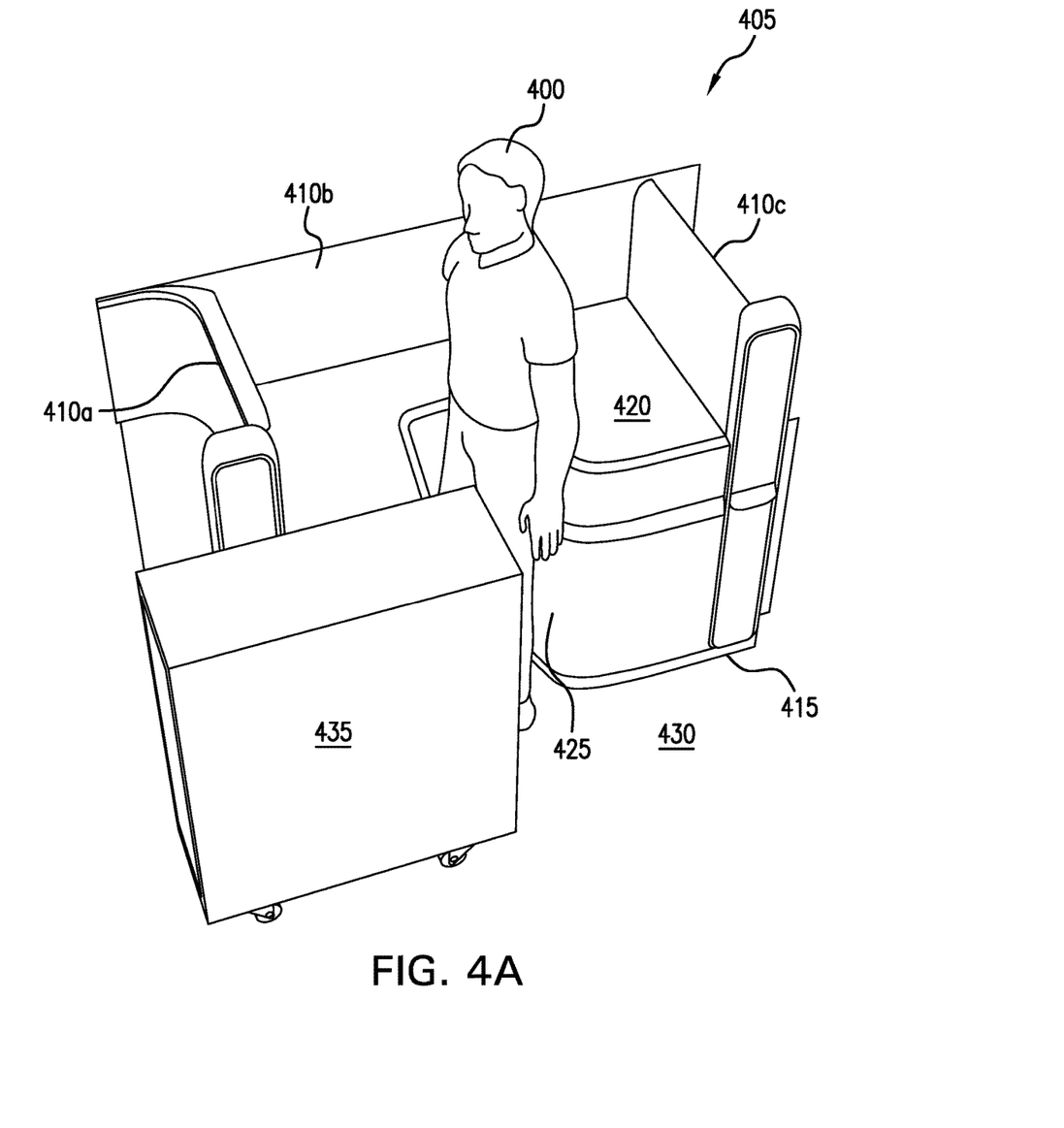
FIGS. 4A and 4B depict a schematic and plan diagram representing a passenger using an exemplary configuration of an airline display compartment.
Figure 4B:
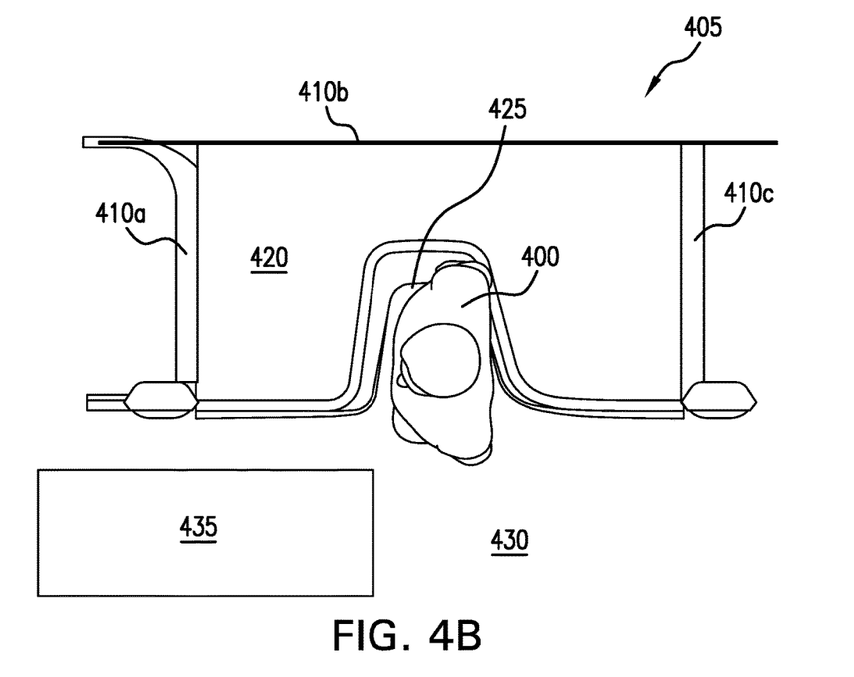

FIGS. 4A and 4B depict a schematic and plan diagram representing a passenger using an exemplary configuration of an airline amenity monument designed, in some examples, for display, merchandising, or entertainment purposes. In the depicted FIG. 4A, a passenger 400 engages with an amenity monument 405. The amenity monument 405 is constructed with various partitions 410a-410c which extend from a floor 415 towards a ceiling and various planar surfaces 420 which extend from the partitions 410a-410c parallel to the floor 415. Furthermore, the various planar surfaces 420 extend from the partitions 410a-410c to an inner amenity monument 425. The inner amenity monument 425 can be entered from an aisle 430 which, for example, may extend between the front of an aircraft cabin to the back of the aircraft cabin. The passenger 400 entered the inner amenity monument 425 to allow a service cart 435 to travel towards the front or the back of the cabin by way of the aisle 430. In the depicted FIG. 4B, a perspective drawing shows the passenger 400 engaging with the amenity monument 405 while allowing the cart 435 to pass down the aisle 430. The amenity monument 405 is advantageously constructed so as not to disrupt travel of the cart 435 or of any people using the aisle 430.

Figure 5A:
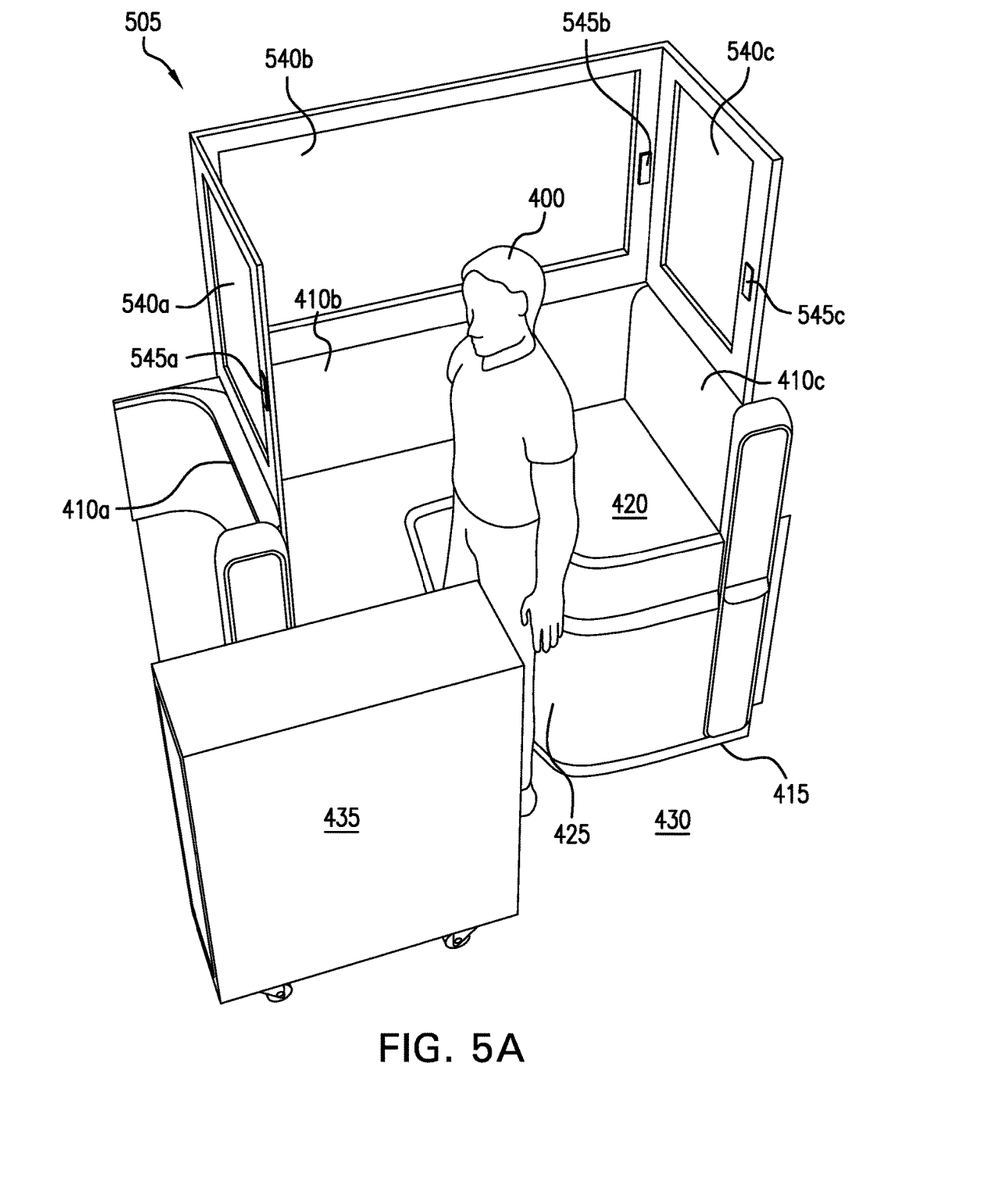
FIGS. 5A and 5B depict a schematic and plan diagram representing a passenger using an exemplary configuration of an airline display compartment with see-through electrically dimmable glass.
Figure 5B:
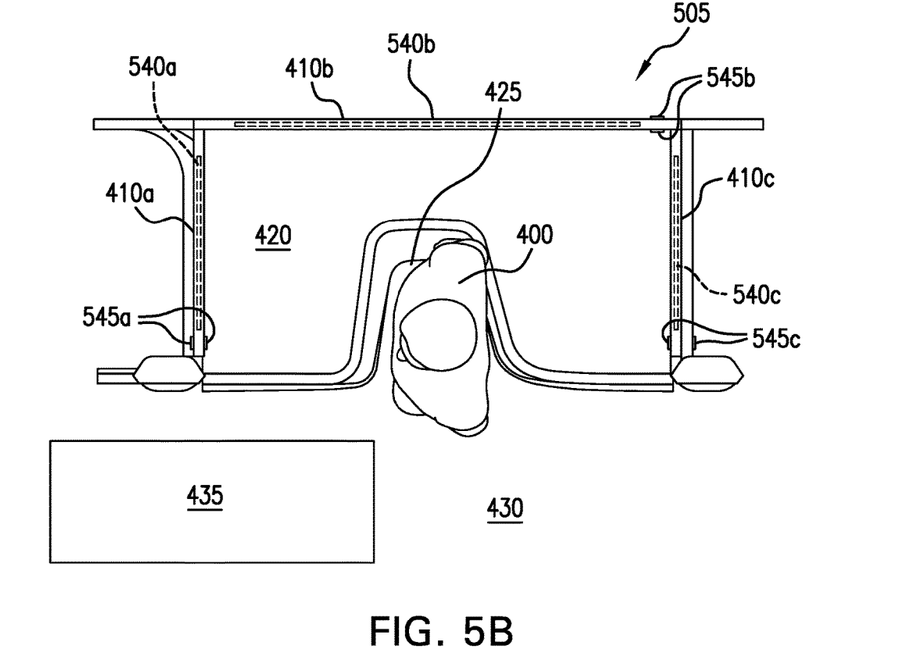

FIGS. 5A and 5B depict a schematic and plan diagram representing a passenger using an exemplary configuration of an airline display compartment with see-through electrically dimmable glass. In the depicted FIG. 5A, a passenger 400 engages with an amenity monument 505 (similar in construction to the amenity monument 405 of FIG. 4A). However, FIG. 5A includes the additional features of three electrically dimmable glass panels 540a, 540b, and 540c. These panels may be set to a transparent condition during taxi, take-off and landing and to an opaque condition during other times to preserve the privacy of passengers seated in suites near the amenity monument.

The electrically dimmable glass panels 540a-540c are shown as being supported by the partitions 410a-410c, respectively. The electrically dimmable glass panels 540a-540c each possess an electrochromic layer that is configured to adjust an amount of transparency of the electrochromic layer based on an applied voltage. Thus, the electrically dimmable glass panels 540a-540c aid in improving the amount of privacy provided to suites adjoining the amenity monument 505.

For example, the electrochromic layer can change light transmission properties to exhibit varied amounts of transparency, translucency, or opacity based on the applied voltage. In some implementations, the amount of voltage supplied to the electrochromic layer of each of the electrically dimmable glass panels 540a-540c may be individually controlled by a controller that determines the light transmission properties of the electrochromic layer based on predetermined settings, or inputs received from a passenger or flight attendant at an input/output (I/O) device such as a touchscreen video monitor at a passenger suite or flight attendant station.

For example, for an electrochromic layer associated with an electrically dimmable glass panel separating a passenger suite from the amenity monument 505, a passenger seated in a passenger suite may select a transparent setting for the electrochromic layer at one of the I/O devices 545a-545c when the passenger desires to increase the amount of light transmission between the passenger suite and the amenity monument 505. Similarly, if the passenger desires to increase the amount of privacy and/or reduce the amount of light entering the passenger suite (such as when the passenger sleeping) the passenger may select a setting at one of the I/O devices 545a-545c to adjust the electrochromic layer to exhibit varied amounts of translucency or opacity. In this sense, a passenger with an electrically dimmable glass panel separating a passenger suite from the amenity monument 505 may cause the electrically dimmable glass panel to become opaque to provide privacy from persons using the amenity monument 505.

In an alternative embodiment, the embodiment of FIG. 5A is enhanced with interactive displays on countertop 420. For instance, multiple flat screens may be provided to substantially surround the passenger with 400 with multimedia content. Relative to the passenger 400 depicted in FIG. 5A, one screen may be positioned in front of the passenger, one to the right of the passenger, and one to the left of the passenger. The displays may optionally be equipped with touch-screens and/or keyboards. The displays may extend the "desktop" of a single computer or may be independent displays optionally driven by separate processors. The display screens are preferably titled upward to accommodate the viewing angle of passenger 400.

In still a further alternative, the multiple displays may be replaced with curved display that occupies substantially the entire span of the countertop 420. This embodiment may provide an enhanced, immersive experience for the passenger 400. Coupled with the privacy provided by the dimmable panels, the passenger 400 may have an enhanced sense of intimacy and privacy that encourages the passenger to interact with the displays.

Further privacy may be provided by dimmable panels which extend along the aisle toward the passenger from panels 540a and 540c. Such may provide almost complete privacy to the passenger 400 and may substantially enhance the likelihood that the passenger will utilize the amenities offered in monument 405.

The amenities may include video games and other multimedia content such as news and information concerning points of interests at the aircraft destinations. In this embodiment, the passenger opening or cavity formed by the curved countertop 420 may be widened to accommodate two passengers. Headsets and handheld controls may be provided for at least two passengers. In one example, the passengers may be spouses and they may view on the screen(s) information related to a scuba-diving excursion and the passengers may book the excursion during the flight. In another example, the passengers are friends or siblings and they may, for a fee, play two-player video games during the flight.

In the depicted FIG. 5B, a perspective drawing shows the passenger 400 engaging with the amenity monument 505 while allowing the cart 435 to pass down the aisle 430. Passengers seated on a side of the electrically dimmable glass panels 540a-540c opposite the amenity monument 505 may desire (or may be indifferent to) increased privacy from the passenger 400 engaging with the amenity monument. The privacy desires of such a seated passenger may be accommodated by adjustably controlling the transparency (or opacity) of one (or more than one) of the electrically dimmable glass panels 540a-540c.

Figure 6A:
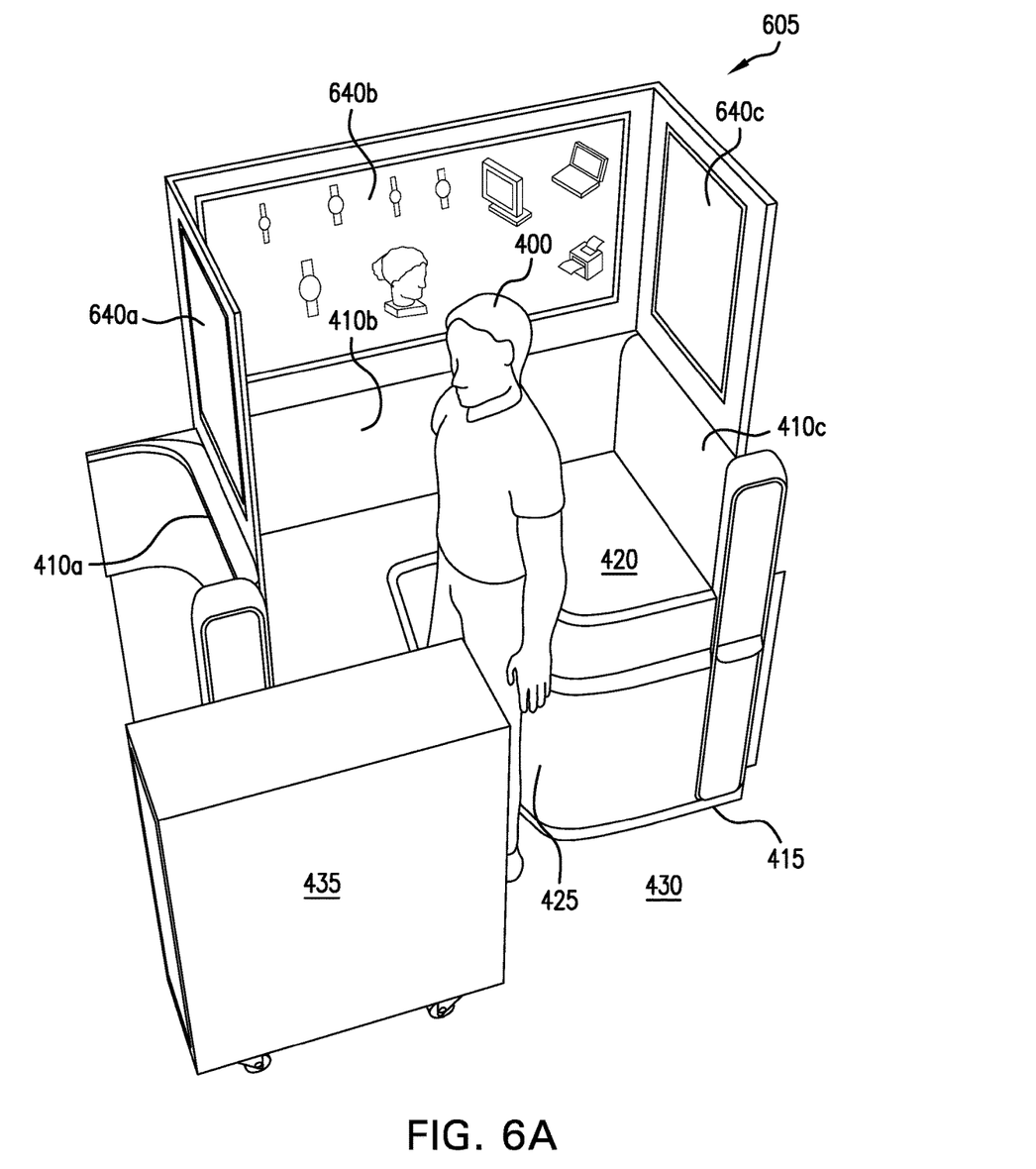
FIGS. 6A and 6B depict a schematic and plan diagram representing a passenger using an exemplary configuration of an airline display compartment with touch screen monitors.
Figure 6B:
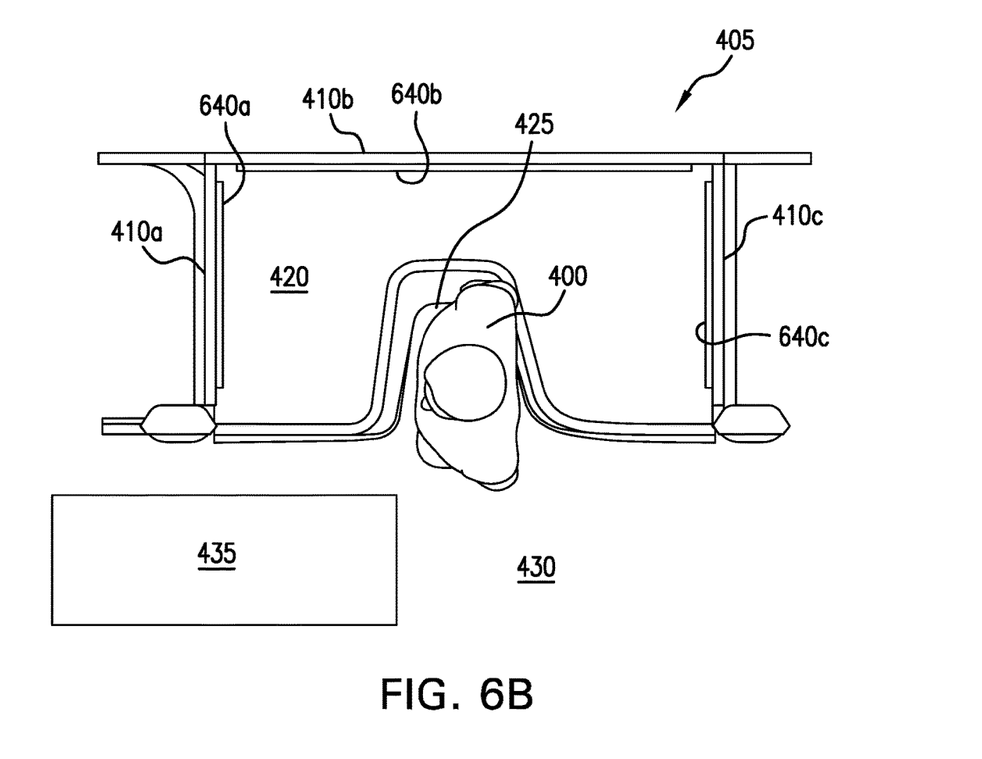

FIGS. 6A and 6B depict a schematic and plan diagram representing a passenger using an exemplary configuration of an airline display compartment with touch screen monitors. In the depicted FIG. 6A, a passenger 400 engages with an amenity monument 605 (similar in construction to the amenity monument 405 and 505 of FIGS. 4A and 5A, respectively). However, FIG. 6A has a different feature of three touch screen monitors 640a, 640b, and 640c. The touch screen monitors 640a-640c are shown as being supported by the partitions 410a-410c, respectively.

The touch screen monitors 640a-640c may be used for a variety of commercial uses. In one example, the touch screen monitors 640a-640c may provide information about the tourist areas and locale based interests the aircraft is flying towards. In some embodiments, the touch screen monitors 640a-640c may be used to display various types of merchandise, such as jewelry or accessories (such as rings or watches), available to passengers through the in-flight magazine or duty free offerings. In some implementations, the touch screen monitors 640a-640c may be used to render images of artefacts of museums or art galleries, thus providing a means to inform the premium passengers on long range flights about possible places of interest they may wish to visit upon landing at their destination. In the present illustrative embodiment, several watches, artefacts, and electronic devices are displayed on the touch screen monitors 640b.

In the depicted FIG. 6B, a perspective drawing shows the passenger 400 engaging with the amenity monument 605 while allowing the cart 435 to pass down the aisle 430. The passenger 400 may interact with any of the touch screen monitors 640a-640c while they are using the amenity monument 605. The touch screen monitors 640a-640c may also be configured to provide purchase options for passengers, such that a passenger can select an item they want to purchase on one of the touch screen monitors 640a-640c, and then pay for the item at the amenity monument 605 (or perhaps add the item to their virtual "cart" and purchase at a later time).

Although various embodiments have been described with reference to the Figures, other embodiments are possible. In some embodiments, an airline display compartment may incorporate a see-through electrically dimmable glass panel. Examples of see-through electrically dimmable glass panels are described in further detail with reference to, for example, at least the various Figures of U.S. Patent Application Ser. No. 62/317,701, entitled "Dimmable Window for Direct View in Aircraft Cabins," by Shawn Claflin, filed on Apr. 4, 2016, the entire contents of which is hereby incorporated by reference for all purposes.

In some embodiments, an amenity monument may be separated from an aisle by a retractable barrier. In some embodiments, the retractable barrier may be constructed of a flexible material with a fastening end extending from a retraction device towards a fastening device. In some embodiments, the retractable barrier may limit the number of participants able to engage at one time. Furthermore, the retractable barrier may increase safety, security, or privacy for those engaging with the amenity monument.

In some embodiments, a barrier may extend from the floor of an amenity monument and may define an entrance to the amenity monument. In some embodiments, the barrier may be constructed of a solid material. In some embodiments, the barrier may be constructed of a flexible material. In some embodiments, the barrier may slidably extend across the entrance. In some embodiments, the barrier may hingedly connect to one side of the entrance to pivotally open or close. In some embodiments, the barrier may limit the number of participants able to engage with the amenity monument at one time.

In some embodiments, the amenity monument may include a gaming room for engaging in video gaming with fellow passengers. In some embodiments, the amenity monument may include a dispensing apparatus, which houses items for purchase and has a display or interactive component allowing a person to purchase items being housed within the dispensing apparatus. In some embodiments, the dispensing apparatus may be a vending machine.

In some embodiments, an amenity monument may include an interactive system. In some embodiments, the interactive system may include various accessories. For example, the accessories may be headphones or an augmented/virtual reality headset. In one example, the accessories may include interactive displays, which may be touchscreen or voice enabled. In some embodiments, the interactive displays may provide relevant information about a destination. In some embodiments, the interactive display may be used to purchase items or content, and may have various connection capabilities to attach a personal device. In some embodiments, the amenity monument may accommodate various payment devices.

In some embodiments, storage compartments may be incorporated into the amenity monument. In some embodiments, an airline display compartment may include a workstation. In some embodiments, an amenity monument may have a sanitizing device. In some embodiments, an amenity monument may include a charging station 1550.

In some embodiments, an activity compartment may include an exercise machine. For example, the exercise machine may be a stationary bicycle or a stair climber. In some embodiments, the exercise machine may be configured to be compact or contained in a small space.

In some embodiments, an activity compartment may have emitting devices to emit light for the purposes of light therapy. For example, the emitting devices emit radiation for the purposes of tanning. In some embodiments, the emitting devices emit mists with or without aromas for the purposes of relaxation, health and wellness, or aromatherapy.

In some embodiments, the amenity monument may include an interactive floor. In some embodiments, the interactive floor may be used in simulations or games. For example, dance or active games may be enhanced by using floor sensors. In some embodiments, the interactive floor may have pressure sensors or may have fiber optic capabilities to allow for various light effects.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. An amenity monument for installation in an aircraft cabin, the monument comprising:
    a contoured counter at least partially defining an inset region configured to permit a user to at least partially enter the monument, thereby providing clearance for passengers or crewmembers transiting an adjacent aisle;
    a region disposed below the counter, the first region at least partially occupied by foot-wells of adjacent passenger seats;
    a plurality of partition elements extending upwardly from the counter at least to a height corresponding to partitions or walls of adjacent passenger seats, passenger suites or monuments; and
    an interactive display screen disposed on the counter or on at least one partition element of the plurality of partition elements, the interactive display screen being coupled to a controller which is adapted to display on the display screen content selected from the group consisting of multimedia content, gaming content, destination-related content, and retail content;
    wherein the amenity monument is configured to permit the utilization of space in between passenger seats, said space being insufficient to accommodate additional seating.

2. The amenity monument of claim 1, wherein the contoured counter has a curved or arcuate contour at least partially defining the inset region.

3. The amenity monument of claim 1, wherein the inset region is configured to accommodate two users while permitting passengers and crew members to transit the adjacent aisle.

4. The amenity monument of claim 1, wherein the interactive display screen comprises a curved display screen providing an immersive multimedia experience.

5. The amenity monument to claim 1, further comprising electronically dimmable panels disposed in or above a portion of the plurality of partition elements.

6. The amenity monument of claim 5, wherein the electronically dimmable panels are coupled to a controller configured to set the panels to a transparent condition during taxi, take-off and landing.

7. The amenity monument of claim 5, further comprising a plurality of privacy panels disposed above counter-height that extend along the adjacent aisle to provide the user additional privacy from passengers or crewmembers transiting the adjacent aisle.

8. The amenity monument of claim 1, further comprising at least one gaming controller and at least one headset, wherein the interactive display screen displays gaming content.

9. The amenity monument of claim 8, wherein the inset is configured to accommodate two users.

10. The amenity monument of claim 1, wherein the first region is adapted to store merchandise that may be purchased via the interactive display in a secure condition, the amenity monument further comprising means to prevent unauthorized access to the merchandise.

11. A amenity monument for installation in an aircraft cabin, the monument comprising:
    a contoured counter at least partially defining an inset region configured to permit a user to at least partially enter the monument, thereby providing clearance for passengers or crewmembers transiting an adjacent aisle; and
    a region disposed below the counter, the first region at least partially occupied by foot-wells of adjacent passenger seats;
    a plurality of partition elements extending upwardly from the counter at least to a height corresponding to partitions or walls of adjacent passenger seats, passenger suites or monuments;
    a plurality of electronically dimmable panels disposed in or above the plurality of partition elements, the plurality of electronically dimmable panels each being adapted to switch between a transparent condition and an opaque or translucent condition;

wherein the amenity monument is configured to permit the utilization of space in between passenger seats, said space being insufficient to accommodate additional seating.

12. The amenity monument of claim 11, wherein the contoured counter has a curved or arcuate contour at least partially defining the inset region.

13. The amenity monument of claim 11, wherein the inset region is configured to accommodate two users while permitting passengers and crew members to transit the adjacent aisle.

14. The amenity monument to claim 11, further comprising an interactive display screen disposed on the contoured counter or on at least one partition element of the plurality of partition elements, the interactive display screen being coupled to a controller which is adapted to display on the display screen content selected from the group consisting of multimedia content, gaming content, destination-related content, and retail content.

15. The amenity monument of claim 14, wherein the interactive display screen is a curved display screen providing an immersive multimedia experience.

16. The amenity monument of claim 14, further comprising at least one gaming controller and at least one headset, wherein the interactive display screen displays gaming content.

17. The amenity monument of claim 14, wherein the first region is adapted to store merchandise that may be purchased via the interactive display in a secure condition, the amenity monument further comprising means to prevent unauthorized access to the merchandise.

18. The amenity monument of claim 11, wherein the plurality of electronically dimmable panels are coupled to a controller configured to set each of the plurality of electronically dimmable panels to a transparent condition during taxi, take-off and landing.

19. The amenity monument of claim 11, further comprising a plurality of privacy panels disposed above counter-height that extend along the adjacent aisle to provide the user additional privacy from passengers or crewmembers transiting the adjacent aisle.

20. The amenity monument of claim 11, wherein the inset is configured to accommodate two users.

* * * * *